United States Patent [19]
Gussler, Jr. et al.

[11] Patent Number: 5,360,226
[45] Date of Patent: Nov. 1, 1994

[54] GRAB AND CENTER GUIDE SYSTEM FOR BOAT LOADING

[76] Inventors: Ova L. Gussler, Jr., 5045 Maid Marion Ct.; Ova L. Gussler, III, 4311 Ferguson Dr., both of Ashland, Ky. 41101

[21] Appl. No.: 61,292

[22] Filed: May 14, 1993

[51] Int. Cl.$^5$ .............................................. B60P 3/10
[52] U.S. Cl. .................................. 280/414.1; 414/534
[58] Field of Search .............................. 280/414.1, 143; 414/532, 533, 534

[56] References Cited

U.S. PATENT DOCUMENTS

| | | | |
|---|---|---|---|
| 3,822,899 | 7/1974 | Slack | 280/414.1 |
| 5,004,260 | 4/1991 | Smily, Sr. | 280/414.1 |

*Primary Examiner*—Mitchell J. Hill

[57] ABSTRACT

The Grab and Center Boat Loading System is a centering guide system which helps one person load a boat on a boat trailer with no other person assisting. The system consists of two side mounted, spring loaded, rotating guides and one front mounted fixed standing guide which may be mounted on most boat trailers. Because each side mounted guide is designed to rotate forward and down if struck from the aft or stand and hold if struck from the side direction, this system helps a person safely load even large boats without any assistance. If, while being loaded, the boat rams one of the guides from the aft direction, the guide will rotate forward and down rather than damage the boat or itself. It will then begin to raise back up and begin to center the boat over the trailer. Once both side guides are standing with the boat confined between them, the boater then simply points the bow toward the front mounted guide and drives the boat slowly and safely to the front of the trailer. After the boat is secured at the bow, the boat and trailer may be pulled out of the water. As the trailer comes out of the water, the side mounted guides will allow the boat to come to rest at or near the center of the trailer. So well does this system work that the boater may even use it to load boats in waters where current and wind would otherwise make it very difficult.

7 Claims, 2 Drawing Sheets

GRAB AND CENTER GUIDE SYSTEM FOR BOAT LOADING

CROSS-REFERENCES TO RELATED APPLICATIONS

A search for related applications revealed that patents have be granted to inventions designed for the same general purpose, but not of like design or function.

Reference to a patent granted to West (U.S. Pat. No. 3,447,815) discloses a boat centering apparatus which has a pair of transversely spaced rollers mounted on upright arms. Rods connect the upright arms to a lever that is pivotally mounted on a pin. A spring biases the lever so as to pull the upright arms together with the specific objective of maintaining contact between the rollers and the sides of the boat.

Reference to a patent granted to Rankin, Jr. (U.S. Pat. No. 3,455,482) discloses a loading guide for a boat trailer including a pair of upstanding arms. The arms are each pivotally mounted to the boat trailer at the proximal end. A roller is provided at the distal end of each arm to engage the side of the boat. Springs normally bias the arms inwardly into engagement with the sides of the boat.

To be noted is that each of the above mentioned guides pivot though the plane perpendicular to the longitudinal axis of the trailer. The Grab and Center guides pivot in a direction parallel to the longitudinal axis of the trailer.

Reference to a patent granted to Tingley (U.S. Pat. No. 4,684,145) discloses a boat guide which has a pair of upright post connected to the trailer at their proximal ends and supporting a cross member at their distal ends. The cross member has a V-shaped notch for catching the keel of the boat to be loaded on to the trailer. The posts, like those on the Grab and Center guides, pivot in the directions parallel to the longitudinal axis of the trailer. The two systems, however, differ in design and how they engage the boat.

SUMMARY OF THE INVENTION

A boat loading centering guide system which helps one person load a boat on a boat trailer with no other person assisting. The system consists of two side mounted, spring loaded, rotating roller guides and one front mounted fixed standing guide and ladder. When a person drives a boat up to the trailer, if the boat is off center it will hit one of the centering guides and cause it to rotate forward, down and under the boat. The other centering guide will remain in a vertical position. The person then uses the boat's motor to move the stern of the boat in the direction needed to line the boat up with the trailer. When the boat comes close to the center of the trailer, the centering guide which rotated down will spring back up and grab and push the boat closer to the center. With both side mounted centering guides now standing vertically, the boat is confined near the center of the trailer. The person then aims the front center of the boat at the front standing guide and drives the boat forward until it stops against either the guide and or winch roller. The person then goes to the front of the boat and ties it off to the pipe ladder if using a ladder and then climbs down and connects the winch. Next, the person goes back and makes necessary preparations fore pulling the trailer and boat out of the water. Finally, the person pulls the trailer and boat out of the water. The side centering guides, being at an angle, will move the boat toward the center as the boat nests on the trailer while being pulled out.

THE NEED FOR THE INVENTION

People with a high profile boat often have a problem and waste time at a boat loading dock centering their boat while loading it on to its trailer. Often, they get the boat on to the trailer, secure it with the winch and pull the trailer out of the water only to find that the boat is too far to one side of the center line of the trailer. They then put the boat back into the water and try to reposition it. Sometimes they have someone get into the water and push the boat to try to center it and it still does not always work. All of this time other people are waiting to use the loading ramp.

This happens because as a loading ramp, especially a steep one, allows the rear of the trailer to go deeper into the water than the front end for loading purposes, it leaves the stern of the boat floating in the water, drifting from side to side over the center line of the trailer. If the boat happens to be in line with the trailer when the trailer comes out of the water, all is well and good. If not, back in the water goes the boat and trailer again while other boaters wait.

Low profile boats like bass boats do not have this problem because they can use fixed side guides that are readily visible to them and the shape of the boat enables them to load without a problem. However, persons loading a boat with a high profile can not see fixed guides unless they are extremely high. Another problem is that little room for error exits when approaching the trailer because the guides have to be set at the same width as the boat to work. Wind and current add to the frustration, especially for the inexperienced boater. Not being able to line up properly, the boat often rams a guide and damages the guide, the boat or both. Damage can easily be caused when a boat strikes a fixed guide. Because of the inertia of the boat, the boat may even try to climb up on the guide. Most boaters with high profile boats do not use fixed guides for this reason.

While a person, therefore, can usually get a boat on a trailer well enough to get the winch hooked and winch it on to the trailer, the problem of centering the boat on the trailer remains. Others have addressed this problem to a limited degree by designing trailers with boat centering devices. This, however, does not address the problem for persons with trailers which have no centering device. This is where this invention is unique. It may be used on many, if not most, existing trailers. It is also unique in that it virtually eliminates the risk of damaging the guide or the boat while loading the boat because this centering guide rotates down under the boat when it is rammed. As the floating stern of the boat moves near the center line of the trailer, the centering guide rotates back up, grabs and pushes the boat closer to the center. The boat is then confined between the centering guides. As the boat trailer then comes out of the water, the boat comes to rest on the center line of the trailer. This system, therefore, eliminates the guesswork and enables people to more easily load a boat with confidence while taking less time. It can also greatly increase high profile boating in the wintertime because a person does not have to get wet trying to center the boat. It may also be modified to work with larger boats by increasing the size, number and length of the centering guides.

BACKGROUND OF THE INVENTION

The inventor owns a 23' Bayliner cabin cruiser which he wanted to trailer often to several different locations and wanted to load onto the boat's trailer without any assistance. He therefore decided to design and build a boat centering guide system. Having done so in the basement of his home and then mounting the centering guide system on his boat's trailer, the inventor and his son took the boat and trailer down to the Ohio River where the inventor backed the boat off of the trailer into the river. He then successfully loaded the boat back on to the trailer. The son, while standing on the shore, watched the bow of the boat pass over the stern of the trailer and then push one of the side mounted guides down because the boat was not centered with the trailer. This action allowed the boat to pass over the side mounted guide instead of damaging it and or the boat as often happens with other systems. After the boat was cradled in the trailer the inventor then used the boats motor to move the stern of the boat sideways toward the center of the trailer and the side mounted guide that was still in a vertical position. As soon as the boat neared the center of the trailer the guide that had rotated down under the boat rotated back up to a vertical position, grabbed the side of the boat and pushed it toward the center of the trailer. The boat was then confined between the two side mounted centering guides. The inventor then drove the boat up toward the fixed standing guide to touch the mooring post. He did this in spite of the fact that the size of the boat prevented him from seeing the side mounted centering guides during the loading procedure except when moving the boat sideways to confine it in between the side mounted centering guides. Within the next few minutes, the inventor successfully unloaded and loaded the boat five times with no assistance. The son simply looked on in amazement as he knew just how difficult it is to load a boat in this manner, especially from a river with wind and current. The inventor encountered no problems in the effort.

BOAT CENTERING GUIDE SYSTEM

This invention is designed to be mounted to most boat trailers. Some may require modification to accommodate different size and shapes of boat trailer frames. However, the basic design and function will be the same. The design of the trailer and the boat will determine the relative position of the side mounted centering guides.

Each side mounted centering guide has one standard rubber roller top [1] and two standard 9" rubber rollers [2] mounted on a long ½" bolt [3] with two nuts [4] on the end. Brackets, [5] which are 3/16" thick, hold the rubber rollers to a ¾" bent steel rod that we refer to as (post) [6]. These brackets [5] are welded to the bent post [6] at approximately a 45 degree angle aft to the axle section of the post. This is why the rubber rollers [2] are fully visible in both figures.

The centering guide's bent post [6] curves at the bottom, passes through the tube at the top of the guide base [7] and is held in place by a ¾×5/16" threaded bolt. This design allows for lateral adjustment of the bent post [6] as determined by the size and design of the boat in relation to the trailer. The guide base in combination with the spring bracket [8] holds tension on the guide spring [9] which the inventor made from a 7/32" spring steel rod. Two U-bolts with nuts [10] hold the spring bracket to the horizontal (axle) section of the bent post [6]. The guide spring [9] is in slight tension when the bent post [6] is in the upright position. This tension increases proportionally as the bent post [6] rotates forward and down, turning in the tube at the top of the guide base [7], in response to applied pressure from the aft direction. When the pressure is no longer present, the guide spring [9] brings the bent post back to its upright position.

Figures 1, 2:
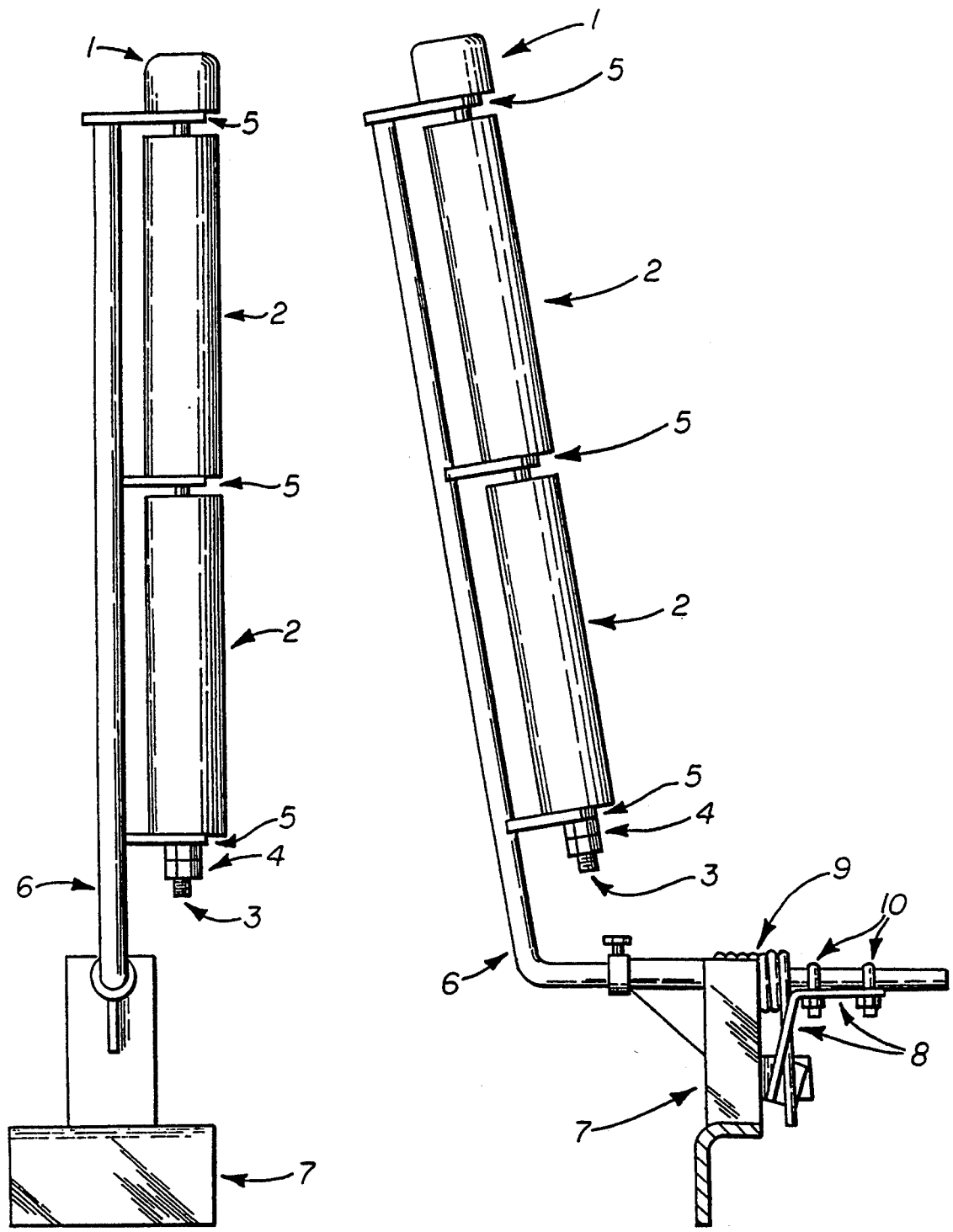
FIG. 1 shows a side view of the port side mounted centering guide (the view of the starboard mounted centering guide being the exact opposite).
FIG. 2 shows the aft view of the same centering guide.
Figure 3:
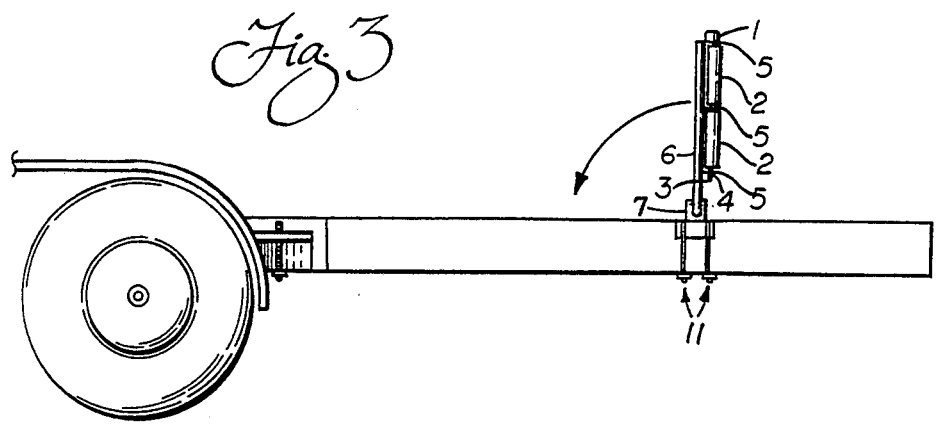
FIG. 3 shows the port centering guide mounted on a trailer.
Figure 4:
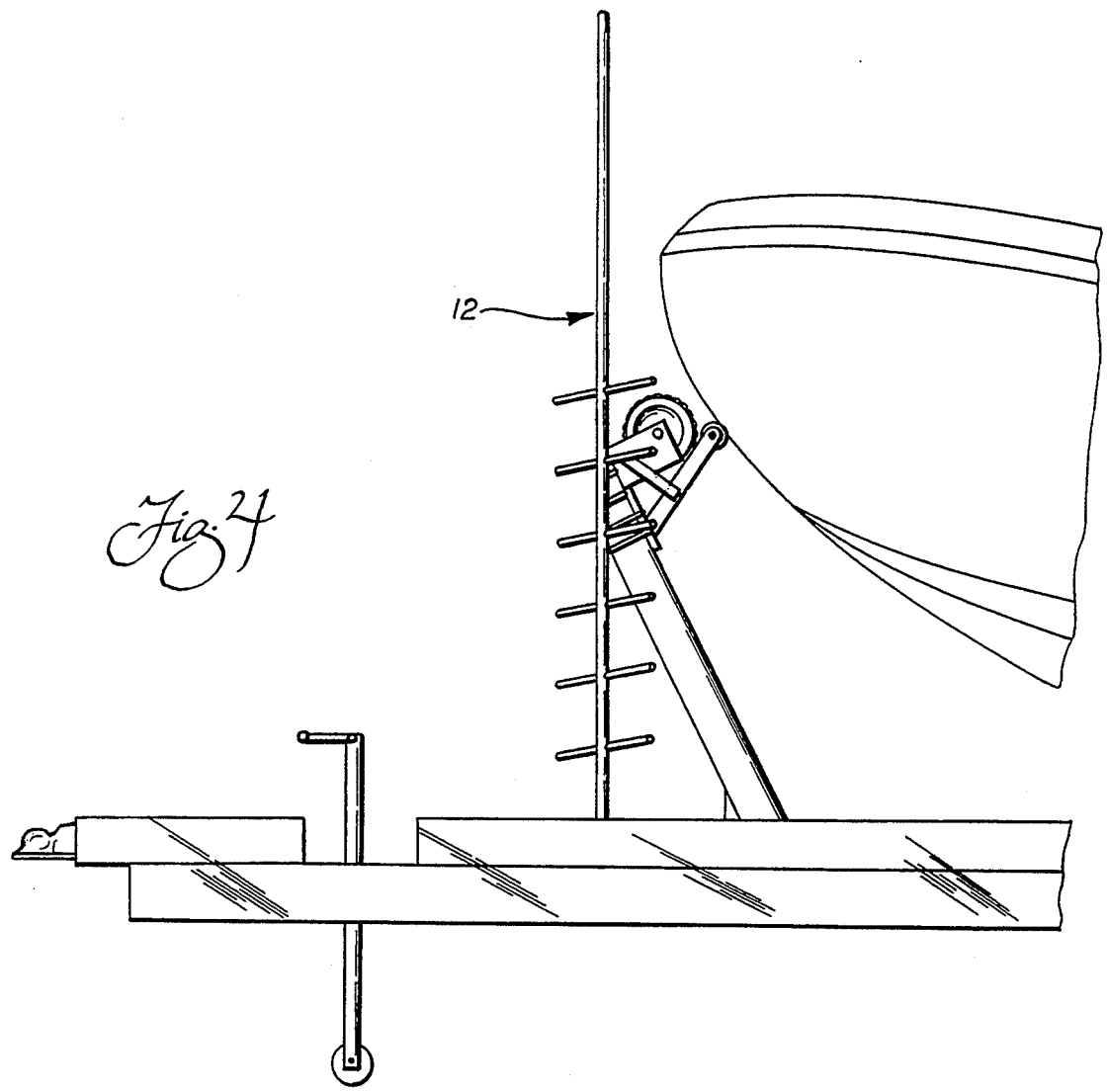
FIG. 4 shows the front mounted fixed standing guide and ladder mounted a trailer.

Each of the two side mounted centering guides are fastened to the frame of the trailer (FIG. 3) by 5/16" U-bolts [11] made of 5/16" steel rod with nuts. Each guide is placed so it will rotate forward toward the front of the trailer and down. Whether or not the guides roll forward or not while loading the boat depends on whether or not the boat is in line with the center line of the trailer when approaching from the water. The guides do not rotate forward if the boat is alined perfectly with the trailer as the boat moves on to the trailer during loading. However, if the boat is not in line with the trailer as it approaches, it will hit one of the side mounted guides. The guide will at that point rotate forward and allow the boat to pass over it safely, instead of damaging the guide or boat. The rubber rollers [2] are attached at a 45 degree angle to the center line of the axle part of the post and remain in contact with the boat at all times.

The boat loading system described herein also includes a front mounted stationary loading guide [12]. The front mounted guide is steel pipe 1¼" in diameter and nine feet tall extending four foot above the bow deck for easy hand hold and with metal ladder rungs welded at approximately 8" intervals.

Loading the boat when the approach is not in line with the trailer should go as follows. The pilot points the bow at the front mounted fixed guide on the trailer [12] and moves in SLOWLY. If the boat is off center and rams one of the side mounted centering guides, that guide will rotate forward and down and allow the boat to pass over it on to the trailer. The centering guide on the other side will remain in a vertical position. Next the pilot uses the boat's motor to move the stern of the boat sideways toward the center of the trailer. As soon as the stern of the boat is close to the center of the trailer the centering guide that is under the boat can and will spring up and while doing so grab the side of the boat and push it toward the center. The pilot will then ease the boat SLOWLY on up to the front mounted guide [12]. The pilot should be able to move the boat forward until it touches the mooring post.

This system can be varied in size, number and length of rollers and guides for different size and design boats. For instance, house boats may need more than one guide on each side. Larger rollers may be used and the rollers may be mounted directly on the post rather than using the 45 degree brackets. The angle of the curve in the bent post [6] may also be customized as the post may be heated with a torch and the angle changed as needed. A two piece notched-joint post with bolt and nut may also be used which would allow the angle to be changed more easily.

What is claimed is:

1. A pair of pivotally mounted guide means capable of being oriented with respect to a boat-trailer for positioning into a proper loading line relative to said boat-trailer, a boat having a bottom and lateral hull surfaces, said guide means comprising:
   1. means for attaching said pair of pivotally mounted guide means to said boat-trailer, wherein each of said pair of guide means has an individual pivot point;
   2. a slidable guide adapted when in a vertical orientation to come into sliding contact with at least a portion of said lateral hull surfaces of said boat, so that when said boat is both floating and positioned between said pair of guide means, is moved into said proper loading line; whereby contact of said at least a portion of lateral hull surfaces with said pair of guide means moves said floating boat during loading into proper position onto said boat-trailer; and
   3. a spring means for orienting said slidable guide in a substantially vertical orientation when not under a forward pressure due to contact with said boat during said loading and capable of permitting said guides to move forward, down, and under said boat upon movement of said guide around said pivot point upon movement during loading off said proper loading line of said boat; wherein said means for attaching is capable of maintaining said pivot point of said pivotally mounted guide means in a substantially fixed position relative to said boat-trailer.

2. The pair of guide means of claim 1, wherein said spring means is a spring bracket to which is attached to said slidable guide.

3. The pair of guide means of claim 1, wherein said vertical orientation of said slidable guide means is at approximately 30 degrees with respect to vertical in a direction outward from said proper loading line.

4. The guide means of claim 1, wherein said guide means has a top and is of sufficient length so that during loading from water onto said boat-trailer, said top of said guide means when in said substantially vertical orientation is above said surface of said body of water when said boat-trailer is at its maximum depth for loading.

5. An improved boat-trailer having load bearing surfaces for transporting a boat with lateral hull surfaces to and from a body of water, comprising: a pair of pivotally mounted guide means for positioning said boat into a proper load line for said boat-trailer during loading said boat from said body of water onto said boat-trailer; each said pair comprising:
   a. a slidable guide having a top and side surfaces and a pivot point, said side surfaces, when said slidable guide is in a vertical orientation, comes into sliding contact with at least a portion of said lateral hull surfaces of said boat, so that when said boat is both floating and positioned between said pair of guide means and prevented from forward motion relative to said boat-trailer and then said trailer is moved into shallower water which in effect causes said trailer to move toward the surface of said body of water and also the bottom of said boat, said boat is moved into said proper loading line; and
   b. a spring means for orienting said slidable guide in a substantially vertical orientation when not under a forward pressure due to contact with said boat during said loading, said guide capable of moving forward, down and under said boat upon movement of said guide around said pivot point depending upon the amount of movement during loading off said proper loading line of said boat and said spring means returns said guides to a vertical orientation when floating boat is maneuvered to an approximate proper loading line; whereby said floating boat is confined between said guides and contact of a portion of lateral hull surfaces with said pair of guide means moves said floating boat during loading into said proper loading line of said boat-trailer.

6. The improved boat-trailer of claim 5, wherein there is additionally a front mounted stationary guide means for indicating in conjunction with each top of each said pair of suitable guides approximately where said proper loading line is located; wherein said stationary guide means is of sufficient length above the surface of said body of water and each said top of said slidable guides also is above said surface of said body of water during loading of said boat from said water.

7. The stationery guide means of claim 6, comprising a shaft connected to the forward center of said boat-trailer and extends above the boat a sufficient distance to provide a mooring post and to which are attached other shafts at substantially right angles at distances apart to provide a ladder and a convenient way to board or leave said boat during loading or unloading.

* * * * *